(12) United States Patent
Koops et al.

(10) Patent No.: US 8,367,971 B2
(45) Date of Patent: Feb. 5, 2013

(54) METHOD OF WORKING MATERIAL WITH HIGH-ENERGY RADIATION

(75) Inventors: Arne Koops, Neu-Lankau (DE); Sven Reiter, Hamburg (DE)

(73) Assignee: tesa SE, Hamburg (DE)

( * ) Notice: Subject to any disclaimer, the term of this patent is extended or adjusted under 35 U.S.C. 154(b) by 533 days.

(21) Appl. No.: 12/621,123

(22) Filed: Nov. 18, 2009

(65) Prior Publication Data
US 2010/0126975 A1      May 27, 2010

(30) Foreign Application Priority Data
Nov. 21, 2008   (DE) .......................... 10 2008 058 535

(51) Int. Cl.
*B23K 26/36* (2006.01)
(52) U.S. Cl. .................. 219/121.85; 219/121.73; 216/65
(58) Field of Classification Search ............. 219/121.73, 219/121.85, 121.67, 121.68, 121.69; 216/65
See application file for complete search history.

(56) References Cited

U.S. PATENT DOCUMENTS

| | | | | |
|---|---|---|---|---|
| 4,242,152 A * | 12/1980 | Stone ........................ | 219/121.61 |
| 4,617,085 A * | 10/1986 | Cole et al. ........................ | 216/66 |
| 4,684,436 A * | 8/1987 | Burns et al. ........................ | 216/65 |
| 4,694,138 A * | 9/1987 | Oodaira et al. ........... | 219/121.85 |
| 4,714,516 A * | 12/1987 | Eichelberger et al. .......... | 216/62 |
| 4,716,270 A * | 12/1987 | Gnanamuthu et al. ... | 219/121.85 |
| 4,785,157 A * | 11/1988 | Gofuku et al. ........... | 219/121.85 |
| 4,894,115 A * | 1/1990 | Eichelberger et al. ......... | 134/1.1 |
| 4,959,119 A * | 9/1990 | Lantzer ........................... | 216/65 |
| 5,298,719 A * | 3/1994 | Shafir ....................... | 219/121.73 |
| 5,521,352 A * | 5/1996 | Lawson .................... | 219/121.67 |
| 5,584,956 A * | 12/1996 | Lumpp et al. ............... | 156/272.8 |
| 5,916,462 A * | 6/1999 | James et al. .............. | 219/121.71 |
| 6,211,485 B1* | 4/2001 | Burgess ..................... | 219/121.7 |
| 6,534,141 B1* | 3/2003 | Hull et al. .................... | 428/36.9 |
| 6,803,540 B2* | 10/2004 | Yamada et al. ........... | 219/121.85 |
| 7,154,065 B2* | 12/2006 | Martukanitz et al. .... | 219/121.64 |
| 7,356,240 B2* | 4/2008 | Adachi et al. ................. | 385/147 |
| 7,682,970 B2* | 3/2010 | Grigoropoulos et al. ..... | 438/662 |
| 2002/0139783 A1* | 10/2002 | Troitski ................... | 219/121.68 |
| 2002/0190038 A1 | 12/2002 | Lawson | |
| 2004/0149706 A1* | 8/2004 | Giloh ........................ | 219/121.73 |

(Continued)

FOREIGN PATENT DOCUMENTS
DE   196 37 255 C1   12/1997
DE   198 24 349 A1   5/1998
(Continued)

OTHER PUBLICATIONS
European Search Report dated Apr. 1, 2010.
(Continued)

*Primary Examiner* — Mary Wilczewski
(74) *Attorney, Agent, or Firm* — Norris McLaughlin & Marcus, P.A.

(57) ABSTRACT

According to the present invention, a method of working material with high-energy radiation is provided, wherein a polymer matrix (1) is irradiated with high-energy radiation, in particular with a laser beam (9), wherein the radiation is focused onto a focal point (11) and the focal point (11) is set such that the focal point (11) lies behind the surface (3) of the polymer matrix (1) facing the radiation, and material removal is brought about at the polymer matrix (1), and consequently a reaction space (13) is created within the polymer matrix (1).

16 Claims, 1 Drawing Sheet

U.S. PATENT DOCUMENTS

| | | | |
|---|---|---|---|
| 2006/0000811 A1* | 1/2006 | Hogan et al. | 219/121.7 |
| 2006/0108064 A1 | 5/2006 | Mori | |
| 2006/0108327 A1* | 5/2006 | Chng et al. | 216/94 |
| 2006/0237407 A1* | 10/2006 | Nguyen et al. | 219/121.85 |
| 2007/0086822 A1 | 4/2007 | Sato | |
| 2009/0002700 A1* | 1/2009 | Wang et al. | 356/301 |
| 2010/0025387 A1* | 2/2010 | Arai et al. | 219/121.69 |
| 2010/0035375 A1* | 2/2010 | Grigoropoulos et al. | 438/99 |
| 2010/0040836 A1* | 2/2010 | Li et al. | 428/187 |
| 2010/0108651 A1 | 5/2010 | Stahr | |
| 2010/0126975 A1* | 5/2010 | Koops et al. | 219/121.73 |
| 2010/0328328 A1* | 12/2010 | Choi et al. | 345/530 |
| 2011/0200802 A1* | 8/2011 | Li et al. | 428/198 |

FOREIGN PATENT DOCUMENTS

| | | |
|---|---|---|
| DE | 10 2006 029941 A1 | 1/2008 |
| DE | 10 2007 018402 A1 | 10/2008 |
| DE | 10 2008 025 583 A1 | 7/2009 |
| FR | 2495982 A1 | 6/1982 |

OTHER PUBLICATIONS

European Search Report for related application EP09175084.4 dated Nov. 7, 2012.

\* cited by examiner

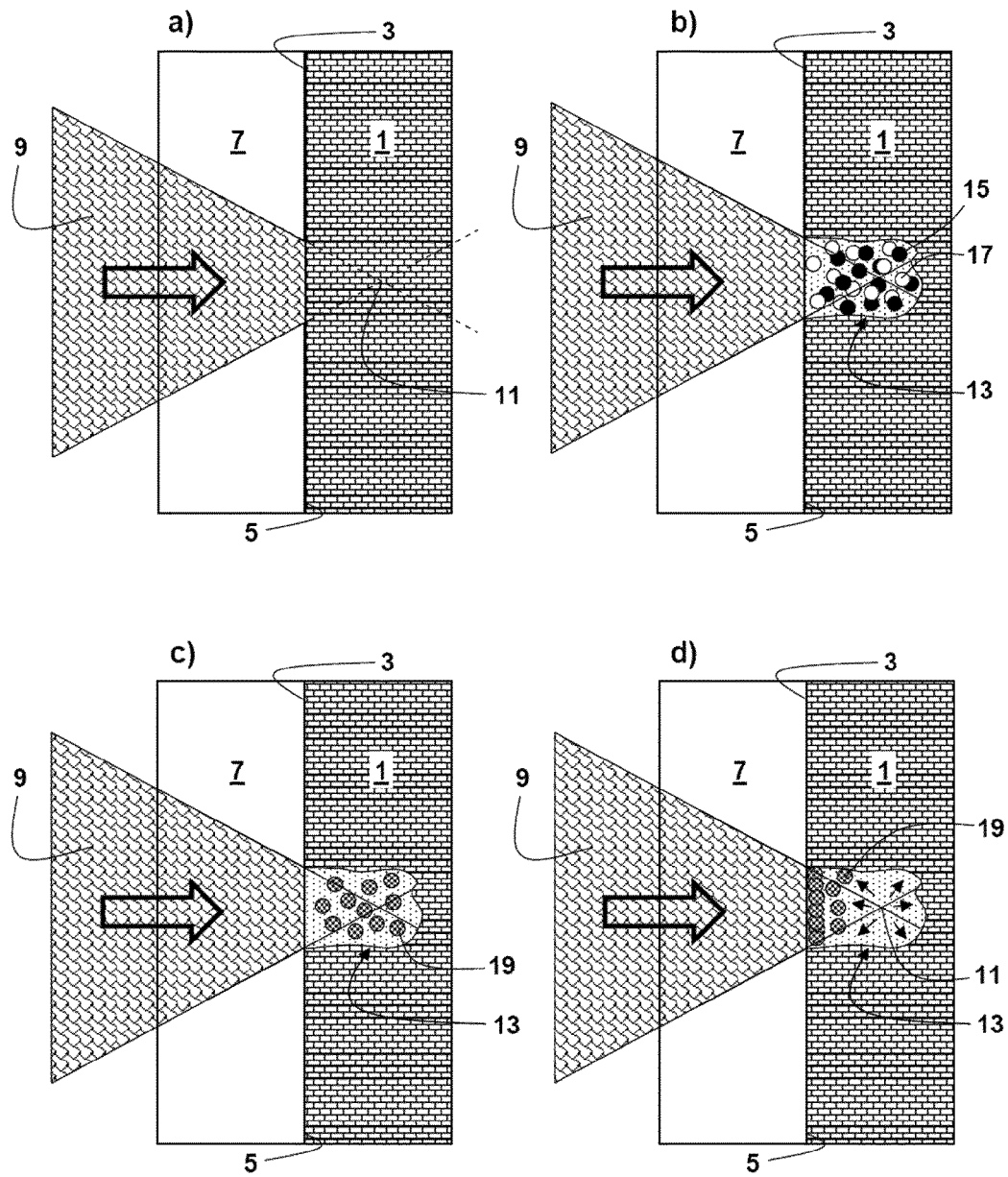

METHOD OF WORKING MATERIAL WITH HIGH-ENERGY RADIATION

BACKGROUND OF THE INVENTION (1) Field of the Invention

The present invention relates to a method of working material with high-energy radiation, wherein a polymer matrix is irradiated with high-energy radiation, in particular with a laser beam.

(2) Description of Related Art

Working material with a laser beam is an established method in industry and is used, inter alia, for welding, cutting, drilling and removing various materials. The variety and complexity of the interacting mechanisms involved in the working of materials with a laser beam are the reason for using a laser beam with process parameters that have been tried out experimentally or in a simulation. When considering how the parameters relate to the adjustable variables of the laser used and the resultant outcome of working, the laser intensity and the time of exposure to the radiation are of particular significance.

It is known that, when working materials by means of a laser, a focused laser beam is directed onto the surface of a workpiece to be worked. The position of the focus is typically chosen such that the distance of the focusing lens makes it possible to obtain the smallest radial extent of the laser beam in relation to the surface of the workpiece. This provides the greatest intensity of the laser at the surface of the workpiece.

As from a certain ratio of the laser power to the extent of the focal spot, the energy density transferred to the workpiece increases abruptly. The coupling in of the laser energy results in phase transformation processes at the surface of the workpiece, making it possible to obtain a specific result of the working.

In the area of surface treatment, the removal of material from the surface of a workpiece by bombardment by means of a pulsed laser beam is referred to as laser ablation.

The energy of the laser photons transferred to the workpiece can lead to the breaking up of chemical bonds, in the case of non-metals it is also possible for short laser pulses to cause a Coulomb explosion. This means that the electrons leave the solid body and some of the remaining positive ions are accelerated out of the surface by Coulomb repulsion.

With laser pulses in the nanosecond range, the energy of the laser leads to heating up of the surface (in the sense of thermal movements of the atoms) during the laser pulse. Since the limited heat conduction allows only a slow energy transfer into the volume, the energy radiated in is concentrated on a very small area. Therefore, the workpiece reaches very high temperatures in this area and abrupt vaporizing of the material can occur. With a high power density of the laser, a plasma of electrons and ions of the material removed may be produced by thermal ionization or ionization induced directly by laser photons, it being possible for the ions of the plasma to be accelerated to energies in excess of 100 eV.

The minimum power or energy density at which ablation is possible (with a given wavelength and pulse length) is known as the ablation threshold. With energy densities above this threshold, the ablation rate increases greatly.

Laser ablation can therefore be used for targeted removal of materials, for example instead of mechanical engraving of hard materials or for drilling very small holes. Alternatively, the material removed may also be used for coating a surface of another workpiece, these techniques being referred to as Pulsed Laser Deposition (PLD) or Laser Transfer Film (LTF).

A disadvantage of laser ablation is that, during and shortly after the laser irradiation, finely thrown up particles of melt, spatter and substances produced by cooling and condensation are often deposited as debris around the working zone. It may be that these decomposition products are removed from the working site by means of process gases. Generally, however, they represent an undesired effect during the working by the laser process and constitute a decisive factor for the quality of the result of the working.

It is usually attempted to minimize these effects by means of laser parameter settings and reactions with process gases. In the case of many materials to be worked, it is possible to use the absorption characteristics to irradiate them with high laser intensities in a short time. The greatest coupling in of the laser energy is usually achieved by the focus of the laser lying on the surface of the workpiece. Energy conversion of the radiation into heat has the effect of forming a heat influencing zone there, in which the thermal effects lead to the desired working results. As a consequence, however, strong thermal processes caused by heat conduction and convection as well as evaporation and plasma formation may produce adverse effects in the surrounding regions.

In the case of poor heat distribution due to a low material-specific coefficient of heat conduction, overheating may occur at boundary surfaces and/or surrounding regions, with the consequence that the material undergoes an undesired structural change. In particular in the case of amorphous and crystalline materials, such as glass, ceramic and crystalline metals such as silicon, it is problematic that this high energy input can lead to adverse effects such as stresses and cracks, which impair the quality of the material to be worked.

A laser beam can be focused in the best possible way if it oscillates in the fundamental mode ($TEM_{00}$ mode) and its energy distribution follows a Gaussian curve. It is possible by appropriate setting of the focal length by means of the focusing lens to achieve the smallest beam diameters of 40 μm to 120 μm and to direct them onto the surface of the workpiece. Conventionally, the highest pulse power density ($J/cm^2$) of the laser beam is brought onto the workpiece when the focus is set to the surface of the workpiece. If the focal plane of the laser beam does not lie on the surface of the workpiece, the pulse power density may be too low, with the result that the laser beam merely heats up the surface but does not bring about any permanent changes in the material.

If, when focusing on the surface, the absorbed energy exceeds a threshold value, the energy input leads to phase transformations in the material. Although the changes brought about as a result do not necessarily have to be accompanied by a change in the state of aggregation of the material, heating up of the surface of the material causes a temperature field to form in the workpiece. Great temperature gradients lead to thermal stresses, which often remain in the workpiece after the cooling phase as residual stress. Mechanical stresses may, however, also remain in the solid body on account of plastic deformations (for temperatures below 450° C.) in the heating-up phase as a result of thermal expansions. The structural changes forming in the heat influencing zone may, however, also leave optically visible defects behind, such as crater formations, cavities and microcracks.

All known methods for working materials with a laser beam share the common feature that a laser beam is directed onto the surface of a material that absorbs the wavelength of the laser and allows as little light as possible to pass through. This has the effect that the light only penetrates into the material to a small depth and the heat influencing zone is decisively determined by the irradiated surface. The local delimitation of the heat influencing zone also has the effect of restricting the absolute energy transfer to the material. Furthermore, the amount of material that can be removed per unit of time is dependent on how large the heat influencing zone is. On the other hand, it is often not desirable to increase the irradiated surface and to compensate this by increased laser power in order to obtain the necessary pulse power density. The reason for this is that the working of the material with a laser beam is often used precisely when particularly accurate working results are to be achieved, for example in the case of particularly fine or microscopic cuts, bores, marks or the like.

It is therefore the object of the present invention to provide an improved method of working material with high-energy radiation in which the heat influencing zone is increased, without significantly impairing the result of the working.

BRIEF SUMMARY OF THE INVENTION

This object is achieved by a method according to Claim 1. Preferred embodiments of the method according to the invention are the subject of the dependent claims.

According to the invention, it is envisaged to provide a method of working material with high-energy radiation, wherein a polymer matrix is irradiated with high-energy radiation, in particular with a laser beam, wherein the radiation is focused onto a focal point and the focal point is set such that the focal point lies behind the surface of the polymer matrix facing the radiation, and material removal is brought about at the polymer matrix, and consequently a reaction space is created within the polymer matrix.

In this case, the material to be worked may be the polymer matrix itself or a workpiece that is in contact with the polymer matrix and is transparent to the radiation wavelength, preferably a glass substrate.

A polymer for the present purposes is any matrix based on polymeric constituents. In addition to the polymeric constituents, the matrix may also comprise any desired non-polymeric constituents, it merely being required for the main constituent to be of a polymeric nature. In particular, the term "polymer matrix" also refers to a mixture of base polymers. In a particularly preferred refinement, the polymer matrix is a thermosetting polymer matrix. It has been found that thermosets in particular are especially suitable for creating a reaction space.

The method according to the invention causes removal of material at the polymer matrix, leading to the formation of a reaction space. A "reaction space" for the purposes of the present invention is a cavity that is suitable for containing reactants for a desired reaction which can take place in the reaction space. These reactants are preferably formed during the creation of the reaction space from the material of the region of the polymer matrix at which the reaction space has been created.

The creation of the reaction space has the effect of increasing the heat influencing zone, without the processing being significantly impaired as a result. The reason for this is that the radiation has a greater depth of penetration in the region of the reaction space than in a polymer matrix without a reaction space. Preferably, after the creation of the reaction space, reactants in a pulverized form are present within the reaction space, the radiation being absorbed to a much greater extent by the reactants in pulverized form in the reaction space than in a bound form in the polymer matrix.

It is advantageous for several reasons if the reaction space is spatially bounded both by the polymer matrix and by a workpiece that is in contact with the polymer matrix and is transparent to the radiation wavelength, preferably a glass substrate. On the one hand, the workpiece may be the actual material to be worked, which is for example to be marked or inscribed. On the other hand, as a result the reaction space is spatially closed off completely and not open to the surface plane of the polymer matrix. As a result, the reactants cannot leave the reaction space and are consequently all available in the reaction space for the desired reaction after the creation of the reaction space. It may be desired that reactants are present in the reaction space after the removal of material and the reactants in the reaction space react under irradiation of the reaction space with high-energy radiation, in particular with a laser beam, to form a product.

The polymer matrix may have, for example, a titanium donor and also a carbon donor. A suitable titanium donor is pure titanium or a titanium compound which has an affinity for providing free titanium ions as a reactant within a short time when exposed to energy. Where appropriate, the free titanium may also be provided by way of a titanium-containing intermediate. The carbon donor provides free carbon, in particular when irradiated with energy. The carbon donor may be a carbon compound and/or free, uncombined carbon. The carbon donor may be provided by the polymer matrix itself, or else an additional carbon component may be present, for example in the form of carbon black. Moreover, the polymer matrix may also comprise further components such as for example polymers, absorbers, etc. As a result of the radiation, the titanium and carbon reactants are provided, for example by breaking up of a titanium compound and a carbon compound, and, when they are exposed to radiation in the reaction space, titanium carbide forms as a desired product. At a local temperature of 700° C. to 2200° C., titanium dioxide is preferably reduced with carbon black or ultra-pure graphite to titanium carbide and carbon monoxide. It is the radiation which produces the temperature that is necessary for the reaction in the reaction space.

The polymer matrix is formed such that it reacts to laser irradiation predominantly by pulverization, thereby releasing the individual reactants, in particular titanium and carbon, and making them available for the reaction to titanium carbide.

For example for the marking of a workpiece such as a glass substrate for instance, it is preferred if the product produced from the reactants, such as for instance titanium carbide, is deposited on the workpiece that is in contact with the polymer matrix, such as for instance a glass substrate, when the reaction space is irradiated with high-energy radiation, in particular with a laser beam. The radiation thereby passes through the workpiece transparent to the radiation wavelength before it impinges on the polymer matrix or the reaction space.

The reaction space preferably has a spatial extent with a diameter in the range of 20-200 µm and a depth in the range of 10-100 µm. It has been found that optimum results are achieved with a reaction space having a spatial extent with a diameter of approximately 70 µm and a depth of approximately 40 µm. This was using as the radiation source a fibre-coupled diode end-pumped laser with a wavelength of 1060 nm or 1064 nm, which has an output power of 12 W.

In a preferred embodiment of the method, the reaction space is created by a first laser pulse and then the reaction space is irradiated with a second laser pulse. The first laser pulse therefore creates the reaction space and preferably reactants present in it in a pulverized form, and the reaction of the reactants to a desired product is assisted by means of a second laser pulse, and the product is preferably propelled by explosive vaporization onto the surface of a transparent workpiece adjoining the reaction space.

It may also be advantageous if a plurality of reaction spaces arranged locally next to one another are created within the polymer matrix by means of irradiating the polymer matrix with high-energy radiation, in particular with a laser beam. The radiation is in this case preferably a pulsed beam and, during the irradiation, the pulsed beam is made to move laterally in relation to the polymer matrix or the polymer matrix is made to move laterally in relation to the pulsed beam. It is of advantage here if neighbouring reaction spaces overlap by at least 25% of their spatial extent. The pulse frequency and the relative speed of movement between the beam and the polymer matrix, i.e. the inscribing speed, are in this case correspondingly coordinated with each other. Consequently, contiguous structures, such as for example lines or surface areas, of reaction spaces can be formed. This may be advantageous in particular when marking or inscribing workpieces.

The radiation is preferably generated with a pulsed laser and a pulse rate of 10 kHz-300 kHz. A high pulse rate is advantageous in particular whenever the laser beam is made to move laterally in relation to the workpiece together with the polymer matrix and/or the workpiece together with the polymer matrix is made to move laterally in relation to the laser beam, in order for example to obtain a linear or two-dimensional marking or inscription on the workpiece. An overlapping of the laser pulses is then achieved even at high inscribing speeds, in order to form linear or two-dimensional structures of the highest possible quality. Furthermore, at a higher pulse rate, the reaction space is repeatedly subjected to laser pulses, so that more radiation energy can be coupled in.

In the case of the method according to the invention, the radiation is focused onto a focal point and the focal point of the radiation is set such that the focal point lies behind the surface of the polymer matrix facing the radiation. In this case, the reaction space is preferably created in the region of the focal point. The focal point may, however, also lie deeper in the polymer matrix or even behind the polymer matrix. In particular in the case of a layer of material bounding the reaction space, it may be advantageous if the focal point is set such that the radiation power density at the surface plane of the polymer matrix is less than 3 J/cm$^2$. The surface plane corresponds here to the plane along the surface of the polymer matrix before creation of the reaction space. In the case of a workpiece that is in contact with the polymer matrix, this corresponds to the delimitation of the reaction space formed by the workpiece. This spares the workpiece from adverse thermal effects, i.e. there is no permanent impairment of the quality of the workpiece, but only a heating effect. In order at the same time to achieve effective creation of the reaction space and a desired reaction, it is advantageous to set the focal point such that the maximum radiation power density within the reaction space is at least 5 J/cm$^2$, preferably at least 10 J/cm$^2$. By contrast with known methods, it is therefore advantageous about the method according to the invention that a deliberate defocusing is set, i.e. the focal point is specifically not set to the surface of the workpiece but to a deeper plane of the polymer layer or behind the polymer matrix.

It follows from this that the maximum pulse power density, which is located at the focal point of the laser beam, is not localized at the boundary layer. This ensures that the maximum energy input is introduced into the material at a distance from the boundary layer and thermally disadvantageous effects cannot affect an adjoining workpiece.

Moreover, the defocusing also makes the laser energy produce efficient conversion of the reactants located in the cavity, since the energy transformation takes place directly at the reactants present in a pulverized form.

The conventional way of achieving material working with the highest possible local resolution is typically to focus the radiation on the surface of the workpiece or set the lowest possible defocusing. This is referred to as negative defocusing if the position of the focus lies in front of the surface of the workpiece and positive defocusing if the position of the focus lies behind the surface of the workpiece. For the purposes of the present invention, therefore, positive defocusing should be set.

Although the defocusing brings about an increase in the diameter of the beam in the plane of the surface of the polymer matrix or a workpiece in contact with it, this does not have the effect in the case of the method according to the invention that it does in the case of conventional methods that the energy input into the material is too low, but that a reaction space is formed, allowing the radiation to introduce energy in deeper lying planes. This is advantageous since the maximum thermal effects are not produced at the boundary layer, where they may be harmful to an adjoining workpiece.

With the set beam cross section, pulsed energy densities that produce a controlled pulverization in the upper regions of the layer are generated. The maximum pulse power density is only achieved with the greater formation of the depth of a cavity in the matrix. Consequently, the maximum energy input is only introduced in deeper planes.

The particles produced in the cavity are then for the most part transformed directly from the solid phase into the gaseous phase in the deeper region of the crater. The reactants produced by the depolymerization react to form the desired products by being heated up and are blown at high speed out of this zone of interaction by explosion and/or a gas jet and impinge on the surface of the glass. This zone of interaction consequently serves as a locally delimited reaction space, in which the laser beam is converted virtually completely into thermal energy.

With the method according to the invention it is possible to rule out any harmful effect on the glass substrate, such as stresses, cracks and instances of vaporization caused by thermal effects. If the method is used for marking or inscribing a glass substrate, the edge sharpness in the deposited marking or inscription is only reduced negligibly by the defocusing.

BRIEF DESCRIPTION OF THE SEVERAL VIEWS OF THE DRAWING(S)

An advantageous exemplary embodiment is explained in more detail below on the basis of the accompanying figures.

FIGS. 1a to 1d show various stages of a reaction space being created in the way according to the invention in a polymer matrix that is in contact with a glass substrate.

DETAILED DESCRIPTION OF THE INVENTION

FIG. 1a shows a polymer matrix 1, the planar surface 3 of which is in direct contact with a planar surface 5 of a glass substrate 7. High-energy radiation in the form of a focused and pulsed laser beam 9 is directed through the glass substrate 7 onto the surface 3 of the polymer matrix 1. The glass substrate 7 is transparent to the wavelength of the radiation, whereas the polymer matrix 1 absorbs the radiation almost completely. The virtual focal point 11 of the laser beam 9 in FIG. 1a is set such that it is at a distance from the planar surface 3 of the polymer matrix 1 or from the planar surface 5 of the glass substrate 7, to be precise behind the planar surface 3 of the polymer matrix 1 in the interior of the polymer matrix 1, whereby positive defocusing is achieved. In order to illustrate this, the virtual focal point 11 is indicated in FIG. 1a by dashed lines. The intensity of the focusing of the laser beam 9 is exaggerated for the purposes of illustration. Therefore, not the maximum pulse power density but only a pulse power density of less than 3 J/cm$^2$ impinges on the surface 3, since, because of the positive defocusing, the irradiated surface area is greater than it would be at the focal point 11. The pulse power density of less than 3 J/cm$^2$ has the effect that the adjoining glass substrate 7 and its surface 5 are spared adverse effects and not exposed to any harmful thermal influence. The polymer matrix 1 on the other hand absorbs the high-energy radiation in the region of the surface 3 and heats up until the thermal energy is so great that the polymer matrix 1 pulverizes. The pulverized region of the polymer matrix 1 is at least partially transparent to the radiation. In the course of the pulverization in the region of the surface 3, the laser beam 9 therefore reaches a greater depth of penetration, and consequently regions lying deeper. Because of the positive defocusing, the laser beam 9 is in this case focused more intensely in the deeper lying regions, and consequently has a higher pulse power density that is transferred to the material of the polymer matrix 1. This process continues in the time of exposure to the laser beam 9 up to the focal point 11 and beyond, so that the reaction space 13 is created. The necessary exposure time to create a reaction space 13 may correspond to the duration of a first pulse of the laser beam 9.

In FIG. 1*b*, the reaction space 13 has reached its required size and a maximum pulse power density of over 10 J/cm$^2$ is prevailing within the reaction space 13. This still virtual focal point 9 in FIG. 1*a* has become an actual focal point 9 within the reaction space 13 in FIG. 1*b*. This is not necessarily required, since the size of the reaction space 13 can be set by the time of exposure to the laser beam. The focal point 9 may even remain virtual for the entire method and even lie outside or behind the polymer matrix 1. Within the reaction space 13, reactants 15, 17 are present in the pulverized material and provide a desired reaction. The reactants 15, 17 are in this example titanium dioxide 15 and pure carbon 17 in the form of carbon black.

FIG. 1*c* shows a stage of the preferred exemplary embodiment in which the reactants 15, 17 have reacted, for example as a result of a second pulse of the laser beam 9, to form a product 19. In the present case, the titanium dioxide 15 is reduced with the pure carbon 17 at a local temperature of 700° C. to 2200° C., produced by the radiation, in the reaction space 13 to form titanium carbide 19 as the product.

As shown in FIG. 1*d*, further exposure to the radiation in the form of a second pulse of the laser beam 9 has the effect of producing an explosive vaporization of the pulverized material within the reaction space 13. In this case, the titanium carbide 19 produced is propelled onto the surface 5 of the glass substrate 7, where the titanium carbide 19 is deposited. The titanium carbide 19 deposited on the glass substrate 7 may serve, for example, as a marking or inscription of the glass substrate 7.

The invention claimed is:

1. A method of working material with high-energy radiation, comprising the steps of
    irradiating a polymer matrix (1) with high-energy radiation,
    focusing the radiation onto a focal point (11),
    setting the focal pint (11) such that the focal point (11) lies behind the surface (3) of the polymer matrix (1) facing the radiation,
    removing material removal at the polymer matrix (1),
    creating a reaction space (13) within the polymer matrix (1)
    providing reactants (15, 17) in the reaction space (13) after the removal of material,
    obtaining reaction in the reaction space (13) of the reactants (15, 17) under irradiation with high-energy radiation to form a product (19).

2. The method according to claim 1, wherein the product (19) is deposited on the workpiece (7) which is in contact with the polymer matrix (1) and is transparent to the radiation wavelength when the reaction space (13) is irradiated with high-energy radiation.

3. The method according to claim 1, wherein the reaction space (13) has a spatial extent with a diameter in the range of 20-200 μm, and a depth in the range of 10-100 μm.

4. The method according to claim 3, wherein the depth is in the range of approximately 40 μm.

5. The method according to claim 3, wherein the diameter is in the range of approximately 70 μm.

6. The method according to claim 1, wherein the reaction space (13) is created by a first pulse of a pulsed laser beam (9) and the reaction space (13) is irradiated with a second pulse of the pulsed laser beam (9).

7. The method according to claim 1, wherein the reaction space (13) is a plurality of reaction spaces arranged locally next to one another and are created within the polymer matrix (1) by means of irradiating the polymer matrix (1) with high-energy radiation.

8. The method according to claim 7, wherein the radiation is a pulsed laser beam (9) and, during the irradiation, the pulsed beam (9) is moving laterally in relation to the polymer matrix (1), or the polymer matrix (1) is made to move laterally in relation to the pulsed beam (9).

9. The method according to claim 7, wherein the reaction spaces (13) are created such that neighbouring reaction spaces (13) overlap by at least 25% of their spatial extent.

10. The method according to claim 1, wherein the radiation is generated with a pulsed laser (9) and a pulse rate of 10 kHz-300 kHz.

11. The method according to claim 1, wherein the focal point (11) lies in the reaction space (13), in the polymer matrix (1) or behind the polymer matrix (1).

12. The method according to claim 1, wherein the irradiating the polymer matrix (1) is accomplished with a laser beam (9).

13. A method of working material with high-energy radiation, comprising the steps of
    irradiating a polymer matrix (1) with high-energy radiation,
    focusing the radiation onto a focal point (11),
    setting the focal point (11) such that the focal point (11) lies behind the surface (3) of the polymer matrix (1) facing the radiation,
    removing material removal at the polymer matrix (1),
    creating a reaction space (13) within the polymer matrix (1),
    wherein the reaction space (13) is spatially bounded by the polymer matrix (1) and by a workpiece (7) which is in contact with the polymer matrix (1) and is transparent to the radiation wavelength, preferably a glass substrate (7), and the radiation passes through the workpiece (7) before it impinges on the polymer matrix (1).

14. A method of working material with high-energy radiation, comprising the steps of
    irradiating a polymer matrix (1) with high-energy radiation,
    focusing the radiation onto a focal point (11),
    setting the focal point (11) such that the focal point (11) lies behind the surface (3) of the polymer matrix (1) facing the radiation,
    removing material removal at the polymer matrix (1), creating a reaction space (13) within the polymer matrix (1)

wherein the focal point (11) is set such that the radiation power density at the surface (3) of the polymer matrix (1) is less than 3 J/cm$^2$.

15. A method of working material with high-energy radiation, comprising the steps of irradiating a polymer matrix (1) with high-energy radiation, focusing the radiation onto a focal point (11), setting the focal point (11) such that the focal point (11) lies behind the surface (3) of the polymer matrix (1) facing the radiation, removing material removal at the polymer matrix (1), creating a reaction space (13) within the polymer matrix (1), wherein the focal point (11) is set such that the maximum radiation power density within the reaction space (13) is at least 5 J/cm$^2$.

16. A method of working material with high-enemy radiation, comprising the steps of irradiating a polymer matrix (1) with high-energy radiation, focusing the radiation onto a focal point (11), setting the focal point (11) such that the focal point (11) lies behind the surface (3) of the polymer matrix (1) facing the radiation, removing material removal at the polymer matrix (1), creating a reaction space (13) within the polymer matrix (1)

wherein the maximum radiation power density within the reaction space (13) is at least 10 J/cm$^2$.

* * * * *